United States Patent
Anan

(10) Patent No.: US 9,641,111 B2
(45) Date of Patent: May 2, 2017

(54) STEPPING MOTOR DRIVING DEVICE AND IMAGE FORMING APPARATUS

(71) Applicant: KYOCERA Document Solutions Inc., Osaka (JP)

(72) Inventor: Naohiro Anan, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 117 days.

(21) Appl. No.: 14/815,063

(22) Filed: Jul. 31, 2015

(65) Prior Publication Data

US 2016/0036362 A1 Feb. 4, 2016

(30) Foreign Application Priority Data

Jul. 31, 2014 (JP) .................................. 2014-156775

(51) Int. Cl.
  *G05B 19/40* (2006.01)
  *H02P 8/10* (2006.01)
  *H02P 8/24* (2006.01)
  *H04N 1/00* (2006.01)

(52) U.S. Cl.
  CPC .................. *H02P 8/10* (2013.01); *H02P 8/24* (2013.01); *H04N 1/00* (2013.01)

(58) Field of Classification Search
  CPC ...... H04N 1/40037; H04N 1/46; G05B 11/28; G05B 9/40; B41J 2/0452; B41J 2/04543
  USPC .................................. 318/685, 696, 599, 811
  See application file for complete search history.

(56) References Cited

U.S. PATENT DOCUMENTS

| | | | | |
|---|---|---|---|---|
| 5,485,070 A | * | 1/1996 | Tominaga | H02P 8/12 318/599 |
| 5,847,721 A | * | 12/1998 | Ogata | B41J 2/2132 347/41 |
| 6,193,358 B1 | * | 2/2001 | Fujita | B41J 2/04543 347/41 |
| 6,325,877 B1 | * | 12/2001 | Murphy | B65C 1/021 156/358 |
| 6,825,636 B2 | * | 11/2004 | Tamaoki | G05B 19/40 318/571 |

(Continued)

FOREIGN PATENT DOCUMENTS

| | | |
|---|---|---|
| JP | H06-113596 A | 4/1994 |
| JP | 08-149889 A | 6/1996 |
| JP | 2003289698 A | 10/2003 |

*Primary Examiner* — Rina Duda
(74) *Attorney, Agent, or Firm* — Studebaker & Brackett PC

(57) ABSTRACT

A stepping motor driving device includes a table, a driving pulse control part, an interpolation number indicating part and a driving part. The table stores thinned data which is thinned from original data and designates a pulse width of a driving pulse relating to a slow-up control or a slow-down control of a stepping motor. The driving pulse control part sequentially reads the thinned data from the table at predetermined intervals, to interpolate the thinned data in accordance with a given interpolation number so as to generate interpolated data and to output the driving pulse with the pulse width designated by the thinned data or the interpolated data by sequentially using the thinned data and the interpolated date at predetermined intervals. The interpolation number indicating part indicates the interpolation number to the driving pulse control part. The driving part drives the stepping motor in accordance with the driving pulse.

8 Claims, 5 Drawing Sheets

(56) References Cited

U.S. PATENT DOCUMENTS

| | | | | |
|---|---|---|---|---|
| 6,917,374 | B2* | 7/2005 | Ohide | H04N 1/40037 |
| | | | | 347/131 |
| 6,960,037 | B2* | 11/2005 | Kojima | B41J 11/425 |
| | | | | 347/9 |
| 7,747,398 | B2* | 6/2010 | McNutt | G05B 11/28 |
| | | | | 702/57 |
| 7,762,640 | B2* | 7/2010 | Kanda | B41J 2/0452 |
| | | | | 347/12 |
| 7,977,996 | B1* | 7/2011 | Kjosness | H03K 5/1565 |
| | | | | 327/291 |
| 8,520,948 | B2* | 8/2013 | Ito | H04N 1/46 |
| | | | | 382/171 |

\* cited by examiner

FIG. 3

| Table No. | NORMAL DATA |
|---|---|
| 1 | 23556 |
| 2 | 20568 |
| 3 | 18488 |
| 4 | 16934 |
| 5 | 15716 |
| 6 | 14728 |
| 7 | 13905 |
| 8 | 13206 |
| 9 | 12604 |
| 10 | 12076 |
| 11 | 11610 |
| 12 | 11194 |
| 13 | 10820 |
| . | . |
| . | . |
| . | . |

| Table No. | THINNED DATA |
|---|---|
| 1 | 23556 |
| 2 | 15716 |
| 3 | 12604 |
| 4 | 10820 |
| . | . |
| . | . |

STEPPING MOTOR DRIVING DEVICE AND IMAGE FORMING APPARATUS

INCORPORATION BY REFERENCE

This application is based on and claims the benefit of priority from Japanese patent application No. 2014-156775 filed on Jul. 31, 2014, the entire contents of which are incorporated herein by reference.

BACKGROUND

The present disclosure relates to a stepping motor driving device and an image forming apparatus including the same, and in particular to an art of a slow-up control or a slow-down control of a stepping motor.

A printer, a copy machine, a facsimile device or a multifunction peripheral which has these functions includes each mechanism, such as a sheet conveying mechanism, which is rotated and driven to convey sheets. As a driving source which supplies a rotation driving force to such a rotation driving mechanism, a stepping motor is widely used.

The stepping motor is a motor which is controlled to be driven by a driving pulse. For example, when a pulse frequency of the driving pulse is decreased, the stepping motor is driven at a low speed, and, when the pulse frequency of the driving pulse is increased, the stepping motor is driven at a high speed.

When the stepping motor is driven at a high speed, the motor cannot be suddenly started at a high speed, and therefore a slow-up control of gradually increasing a pulse frequency of a driving pulse and gradually increasing a rotation speed is performed. By contrast with this, to stop the stepping motor which is rotating at a high speed, the motor cannot be suddenly stopped, and a slow-down control of gradually decreasing a pulse frequency of a driving pulse and gradually decreasing a rotation speed is performed.

Generally, a pulse width used for a driving pulse at each point of time to perform a slow-up control or a slow-down control of a stepping motor is converted into data, and is stored in a table. A stepping motor driving device sequentially reads each data from a table stored in a SRAM (Static Random Access Memory) or the like, and uses a timer function of hardware, such as an ASIC (Application Specific Integrated Circuit), to output a driving pulse of the pulse width corresponding to each read data.

A table length of the table is determined based on a slow-up time, an start-up frequency and a steady frequency. When, for example, a pulse frequency changes from 500 Hz to 4000 Hz during 500 ms, 1000 items or more of data are stored in the table in some cases. When the table length is long, a memory capacity for storing the table length increases, and a writing time for writing the table also increases.

Further, it is possible to shorten the table length by calculating and determining a pulse width per predetermined time based on one basic pulse width using a divider or the like. However, a circuit scale of a divider or the like which performs such calculation becomes large, and therefore it is not practical to mount the divider or the like on a small scale circuit, such as an ASIC or a FPGA (Field Programmable Gate Array).

SUMMARY

In accordance with an embodiment of the present disclosure, a stepping motor driving device includes a table, a driving pulse control part, an interpolation number indicating part and a driving part. The table is configured to store thinned data which is thinned from original data and designates a pulse width of a driving pulse relating to a slow-up control or a slow-down control of a stepping motor. The driving pulse control part is configured to sequentially read the thinned data from the table at predetermined intervals, to interpolate the thinned data in accordance with a given interpolation number so as to generate interpolated data and to output the driving pulse with the pulse width designated by the thinned data or the interpolated data by sequentially using the thinned data and the interpolated date at predetermined intervals. The interpolation number indicating part is configured to indicate the interpolation number to the driving pulse control part. The driving part is configured to drive the stepping motor in accordance with the driving pulse outputted by the driving pulse control part.

In accordance with an embodiment of the present disclosure, an image forming apparatus includes the stepping motor driving device, a stepping motor, a rotating member and an image forming part. The stepping motor is configured to be driven by the stepping motor driving device. The rotating member is configured to be driven by the stepping motor. The image forming part is configured to form an image on a recording medium.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 3 is a chart to explain thinning of data which designates a pulse width of a driving pulse relating to a slow-up control of a stepping motor.

DETAILED DESCRIPTION

Figure 1:
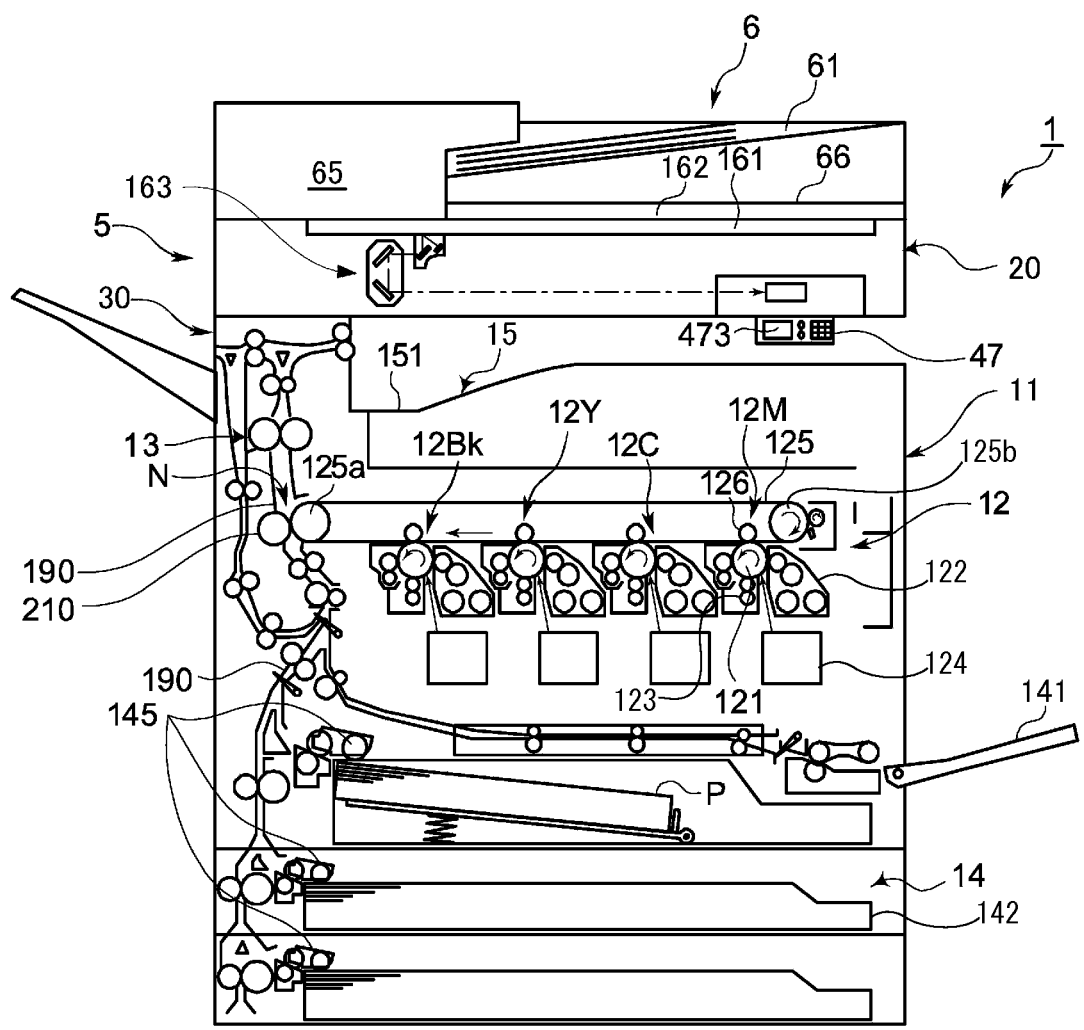
FIG. 1 is a front sectional view showing a structure of an image forming apparatus according to an embodiment of the present disclosure.

An image forming apparatus according to an embodiment of the present disclosure will be described below with reference to the drawings. FIG. 1 is a front sectional view showing a structure of an image forming apparatus according to the embodiment of the present disclosure. An image forming apparatus 1 is a multifunction peripheral having a plurality of functions, such as a copying function, a printer function, a scanner function and a facsimile function.

The image forming apparatus 1 roughly includes an apparatus main body 11, a document reading device 20 which is arranged above the apparatus main body 11 and faces the apparatus main body 11, and a joint part 30 which is provided between the document reading device 20 and the apparatus main body 11.

The document reading device 20 is supported by an upper end part of the joint part 30. The document reading device 20 includes a document reading part 5 and a document conveying part 6.

The document reading part 5 includes a contact glass 161 which is attached to an opening in an upper face of a document reading part housing, and on which document is set. The contact glass 161 includes a fixed document reading part (not shown) which reads set document, and a conveyed document reading part (not shown) which reads document conveyed by the document conveying part 6. The document reading part 5 includes an openable/closable document pressing cover 162 which presses document set on the contact glass 161, and a reading unit 163 which reads each image of the document set on the fixed document reading part of the contact glass 161 and the document conveyed to the conveyed document reading part of the contact glass 161. The reading unit 163 optically reads the image of the document by using an image sensor, such as a CCD (Charge Coupled Device) or a CMOS (Complementary Metal Oxide Semiconductor), and generates image data.

The document conveying part 6 includes a document platen 61 on which document is set, a document discharging part 66 which discharges document from which an image has been read, and a document conveying mechanism 65. The document conveying mechanism 65 includes feeding rollers, conveying rollers and a sheet reversing mechanism which are not shown. The document conveying mechanism 65 drives the feeding rollers and the conveying rollers to feed document set on the document platen 61 one by one and convey the document to the conveyed document reading part of the contact glass 161 to enable the reading unit 163 to read the document, and then discharges the document to the document discharging part 66. Further, a document reversing mechanism reverses a top face and a bottom face of the document and conveys the document again to the conveyed document reading part of the contact glass 161, so that the document conveying mechanism 65 enables the reading unit 163 to read images on both faces of the document.

Further, the document conveying part 6 is rotatably provided to the document reading part 5 such that a front face side of the document conveying part 6 can move upward. By moving the front face side of the document conveying part 6 upward and opening the upper face of the contact glass 161 as a document platen, a user can set reading document, such as a book placed in an open state, on the upper face of the contact glass 161.

An operating part 47 is arranged in a front face of the document reading device 20. The operating part 47 accepts an operator's instruction, such as an image forming operation executing instruction or a document reading operation executing instruction, of various operations and processing which the image forming apparatus 1 can execute. The operating part 47 includes a display part 473 which displays an operation guidance to the operator.

The apparatus main body 11 includes an image forming part 12, a fixing part 13, a feeding part 14 and a sheet discharging part 15.

When the image forming apparatus 1 performs document reading operation, the document reading part 5 optically reads the image of the document conveyed from the document conveying part 6 or the image of the document set on the contact glass 161, and generates image data. The image data generated by the document reading part 5 is stored in a built-in HDD or a computer connected with a network.

When the image forming apparatus 1 performs an image forming operation, the image forming part 12 forms a toner image on a sheet P as a recording medium fed from the feeding part 14, based on image data generated by the document reading operation, image data received from a user terminal device, such as a computer or a smartphone connected with the network, or image data stored in the build HDD (Hard Disk Drive). Image forming units 12M, 12C, 12Y and 12Bk of the image forming part 12 each include a photosensitive drum 121 (image carrier), a development device 122 which supplies a toner to the photosensitive drum 121, a toner cartridge (not shown) which accommodates the toner, a charging device 123, an exposure device 124 and a primary transfer roller 126.

When performing color printing, the magenta image forming unit 12M, the cyanogen image forming unit 12C, the yellow image forming unit 12Y and the black image forming unit 12Bk of the image forming part 12 each form a toner image on the photosensitive drum 121 by charging, exposing and developing processes based on an image having each color component which configures image data, and causes the primary transfer roller 126 to transfer the toner image onto an intermediate transfer belt 125 stretched around a driving roller 125a and a driven roller 125b.

An image carrying face to which a toner image is transferred is set to an outer circumference face of the intermediate transfer belt 125, and the intermediate transfer belt 125 is driven by the driving roller 125a in a state where the intermediate transfer belt 125 comes into contact with the circumference face of the photosensitive drum 121. The intermediate transfer belt 125 endlessly runs between the driving roller 125a and the driven roller 125b in synchronization with each photosensitive drum 121.

A toner image of each color transferred onto the intermediate transfer belt 125 is overlapped on the intermediate transfer belt 125 by adjusting a transfer timing to form a color toner image. A secondary transfer roller 210 transfers the color toner image formed on the top face of the intermediate transfer belt 125 to the sheet P conveyed on a conveying path 190 from the feeding part 14 at a nipping part N between the secondary transfer roller 210 and the driving roller 125a across the intermediate transfer belt 125. Subsequently, the fixing part 13 fixes the toner image formed on the sheet P, to the sheet P by thermal compression. The sheet P for which the fixing processing has been finished and on which the color image has been formed is discharged to a discharge tray 151.

The feeding part 14 includes a manual feed tray 141 and a plurality of feeding cassettes 142. A controlling part which is not shown in FIG. 1 rotates and drives pick-up rollers 145 of the feeding cassettes 142 in which sheets of sizes designated in accordance with an operator's instruction, and conveys the sheet P accommodated in each feeding cassette 142 to the nipping part N.

Figure 2:
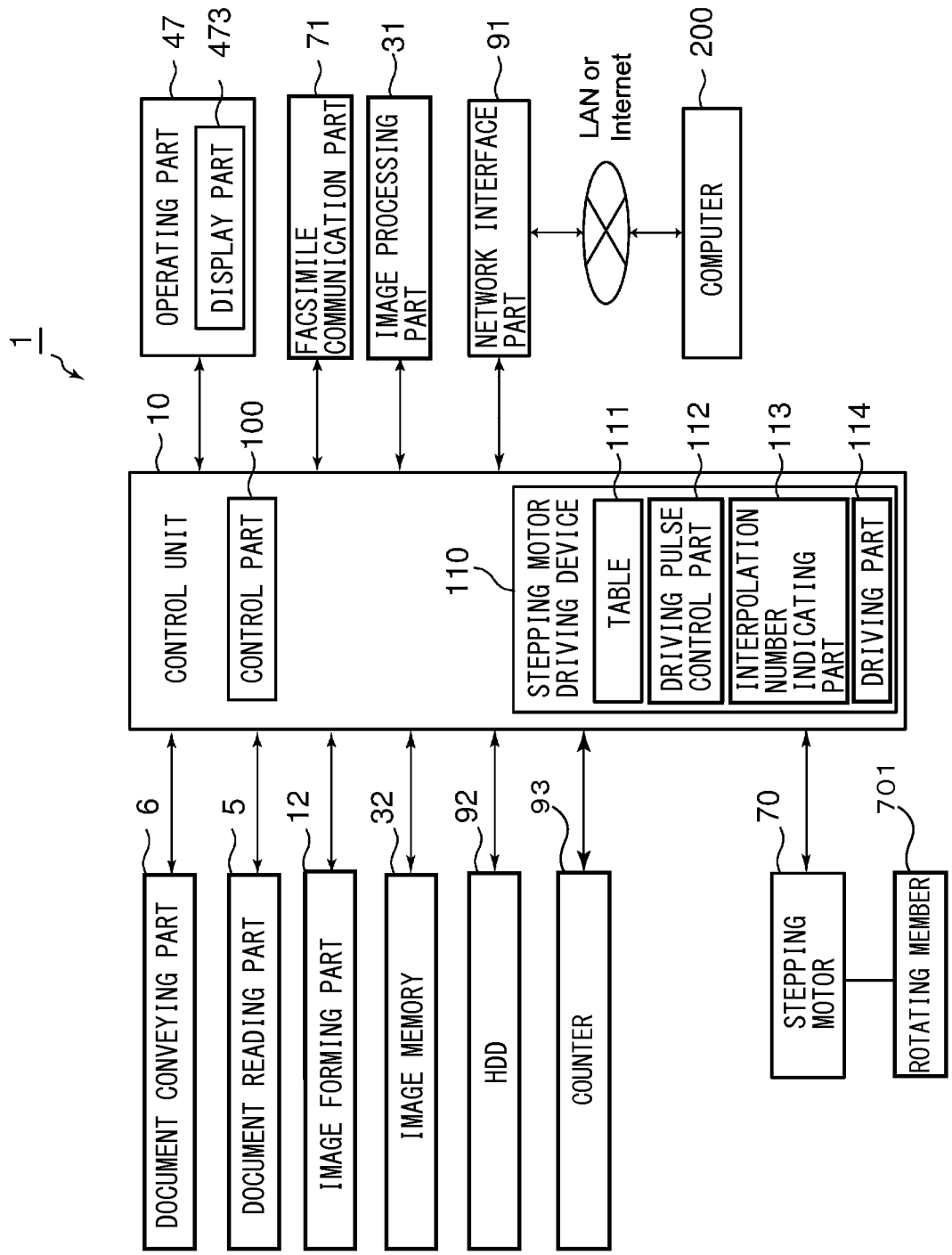
FIG. 2 is a functional block diagram roughly showing a main inside structure of the image forming apparatus.

Next, a configuration of the image forming apparatus 1 will be described. FIG. 2 is a functional block diagram roughly showing a main inside structure of the image forming apparatus 1.

The image forming apparatus 1 includes a control unit 10. The control unit 10 includes a CPU (Central Processing Unit), a RAM (Random Access Memory), a ROM (Read Only Memory) and a dedicated hardware circuit, and controls an entire operation of the image forming apparatus 1.

The document reading part 5 includes the above-mentioned reading mechanism 163 which includes a light irradiating part and a CCD sensor. The document reading part 5 causes the light irradiating part to irradiate document with light under control of the control unit 10, causes the CCD sensor to receive reflected light and reads an image of the document.

An image processing part 31 performs image processing on image data of the image read by the document reading part 5 when necessary. For example, the image processing part 31 performs predetermined image processing, such as shading correction, to improve quality of the image read by the document reading part 5 after the image is formed by the image forming part 12.

An image memory 32 is an area in which data of the document image read by the document reading part 5 is temporarily stored or printing target data of the image forming part 12 is temporarily stored.

The image forming part 12 forms an image of print data read by the document reading part 5 or print data received from a computer 200 connected with the network.

An operating part 47 receives an operator's instruction of various operations and processing which the image forming apparatus 1 can execute. The operating part 47 includes a touch panel display part 473 which is formed by a liquid crystal indicator.

The display part 473 provides various screens, such as an operation screen, a preview screen, and a print job status confirmation screen, when the image forming apparatus 1 is in a normal operation mode. Meanwhile, the display part 473 is turned off when the image forming apparatus 1 is in a sleep mode.

A facsimile communication part 71 includes a coding/decoding part, a modulating/demodulating part and a NCU (Network Control Unit) which are not shown, and transmits a facsimile using a public telephone line.

The network interface part 91 is configured as a communication module, such as a LAN (Local Area Network) board, and transmits and receives various data to and from the computer 200 and the like in the local area through the LAN or the like connected to the network interface part 91.

A HDD (Hard Disk Drive) 92 is a large capacity storage device which stores document images and the like read by the document reading part 5.

A stepping motor 70 is a driving source which drives each rotating member 701. Each rotating member 701 includes the photosensitive drums 121 of the image forming part 12 and conveying rollers of the document conveying mechanism 65.

The control unit 10 includes a control part 100 and a stepping motor driving device 110.

The control part 100 is connected with the document reading part 5, the document conveying part 6, the image processing part 31, the image memory 32, the image forming part 12, the operating part 47, the facsimile communication part 71, the network interface part 91 and the HDD 92, and controls these parts.

The stepping motor driving device 110 is a device which drives the stepping motor 70, and includes a table 111, a driving pulse control part 112, an interpolation number indicating part 113 and a driving part 114. The stepping motor driving device 110 can be configured as an ASIC, for example. The table 111 is arranged in a SRAM in the ASIC, for example.

In the table 111, data which designates pulse widths of driving pulses relating to a slow-up control or a slow-down control of the stepping motor 70 are stored. In this regard, thinned data thinned from original data (data which designates a pulse width used to perform the slow-up control or the slow-down control. All data used to execute the slow-up control or the slow-down control of the stepping motor 70. "Normal data" which will be described below) which need to be used for the slow-up control or the slow-down control of the stepping motor 70 are stored. That is, in the table 111, all original data which needs to be used for the slow-up control or slow-down control of the stepping motor 70 are not stored, and thinned data thinned in accordance with a given rule are stored.

FIG. 3 is a chart to explain thinning of data which designates a pulse width of a driving pulse relating to a slow-up control of the stepping motor 70. "NORMAL DATA" on the left side in FIG. 3 is a value representing pulse widths, and represents perfect data (the above-mentioned all original data) which are not thinned. "THINNED DATA" on the right side in FIG. 3 is a value representing pulse widths, and represents thinned data which is stored in the table 111. In this regard, an example where every four normal data is stored in the table 111 with 3 points thinning.

In addition, FIG. 3 illustrates a table example of a slow-up control, and therefore, as the table number increases, numbers represented by normal data and thinned data gradually decrease. Although not shown, according to the slow-down control, as the table number increases, the numbers represented by normal data and thinned data gradually increase.

Generally, from the table arranged in the SRAM of the ASIC, each normal data is sequentially read in order of table numbers every time a predetermined period of time passes, and a driving pulse of a numerical value (pulse width) designated by each normal data is outputted.

By contrast with this, the driving pulse control part 112 according to the present embodiment sequentially reads each thinned data from the table 111 every time a predetermined period of time passes to make a driving pulse of a numerical value represented by the thinned data, performs linear interpolation by using the thinned data and next thinned data stored in the table 111 to calculate a numerical value which is a numerical value between the thinned data and the next thinned data and is not stored in the table 111. The driving pulse control part 112 outputs a driving pulse taking the calculated numerical value as a pulse width every time the predetermined period of time passes in a time zone between a timing at which the thinned data needs to be read and a timing at which the next thinned data needs to be read. That is, the driving pulse control part 112 outputs a driving pulse of each pulse designated by read thinned data, and outputs a driving pulse of each pulse width designated by interpolated data generated by interpolating the thinned data.

Figure 4:
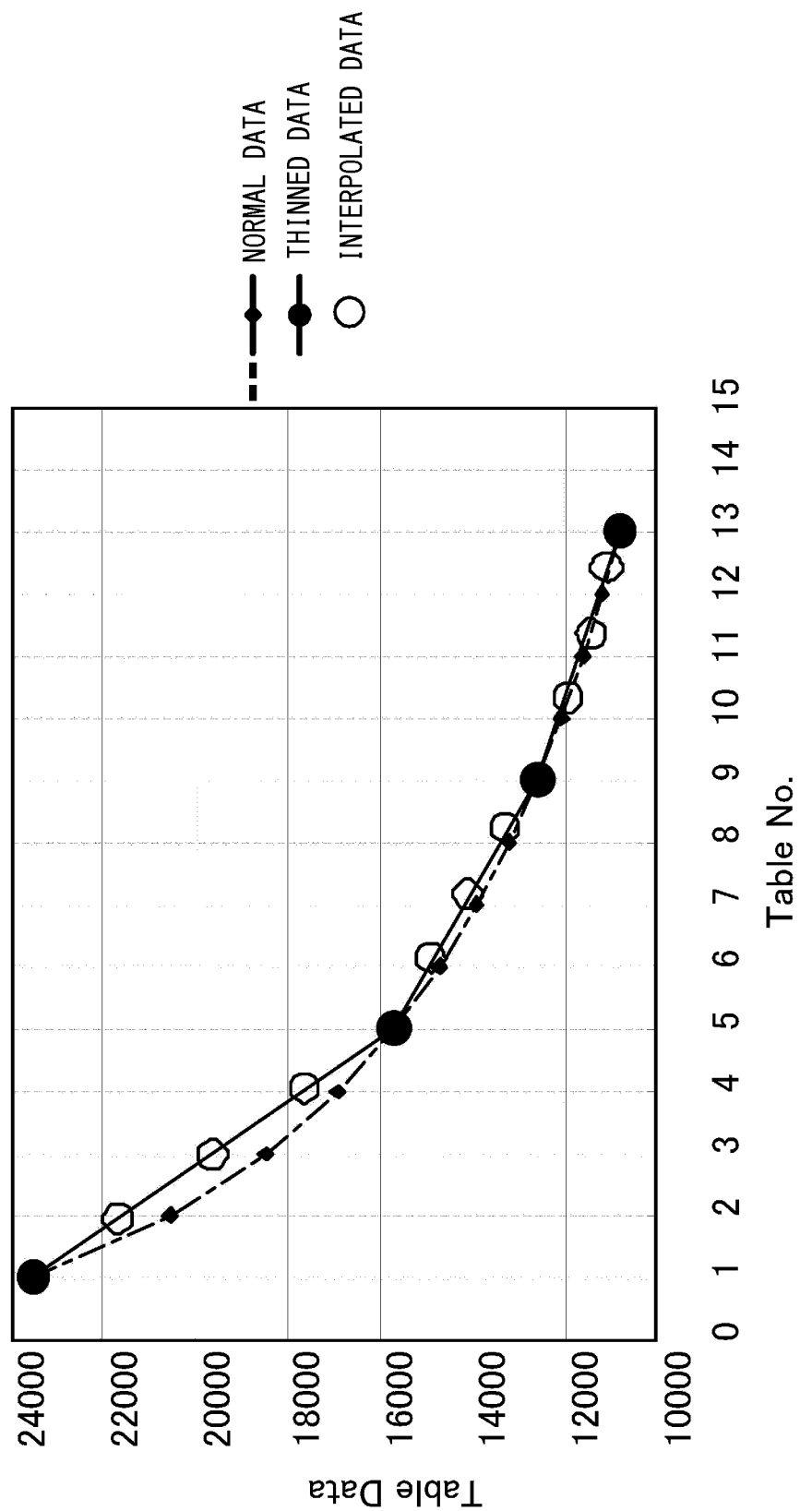
FIG. 4 is a graph to plot normal data and thinned data which are shown in FIG. 3 and interpolated date generated by interpolation.

FIG. 4 is a graph to plot normal data and thinned data which are shown in FIG. 3 and interpolated date generated by interpolation. In this regard, an example where three normal data are thinned between two thinned data will be described. The driving pulse control part 112 interpolates the three data between the two thinned data. In this case, the driving pulse control part 112 generates interpolated data by linear interpolation based on thinned data (first thinned data) which is read from the table 111 as described above and thinned data (second thinned data) which is stored in the table 111 and needs to be read next. As shown in FIG. 4, a plurality of normal data set between two normal data including the same numerical values as those of the two thinned data are not linear. However, the driving pulse control part 112 linearly interpolates the two thinned data. Consequently, it is possible to obtain values which approximate a plurality of normal data set between the two normal data with a relatively small calculation load.

Next, the thinned data which is actually stored in the table 111, and a slow-up control of the stepping motor 70 performed based on the thinned data and interpolated data will be described.

Figure 5:
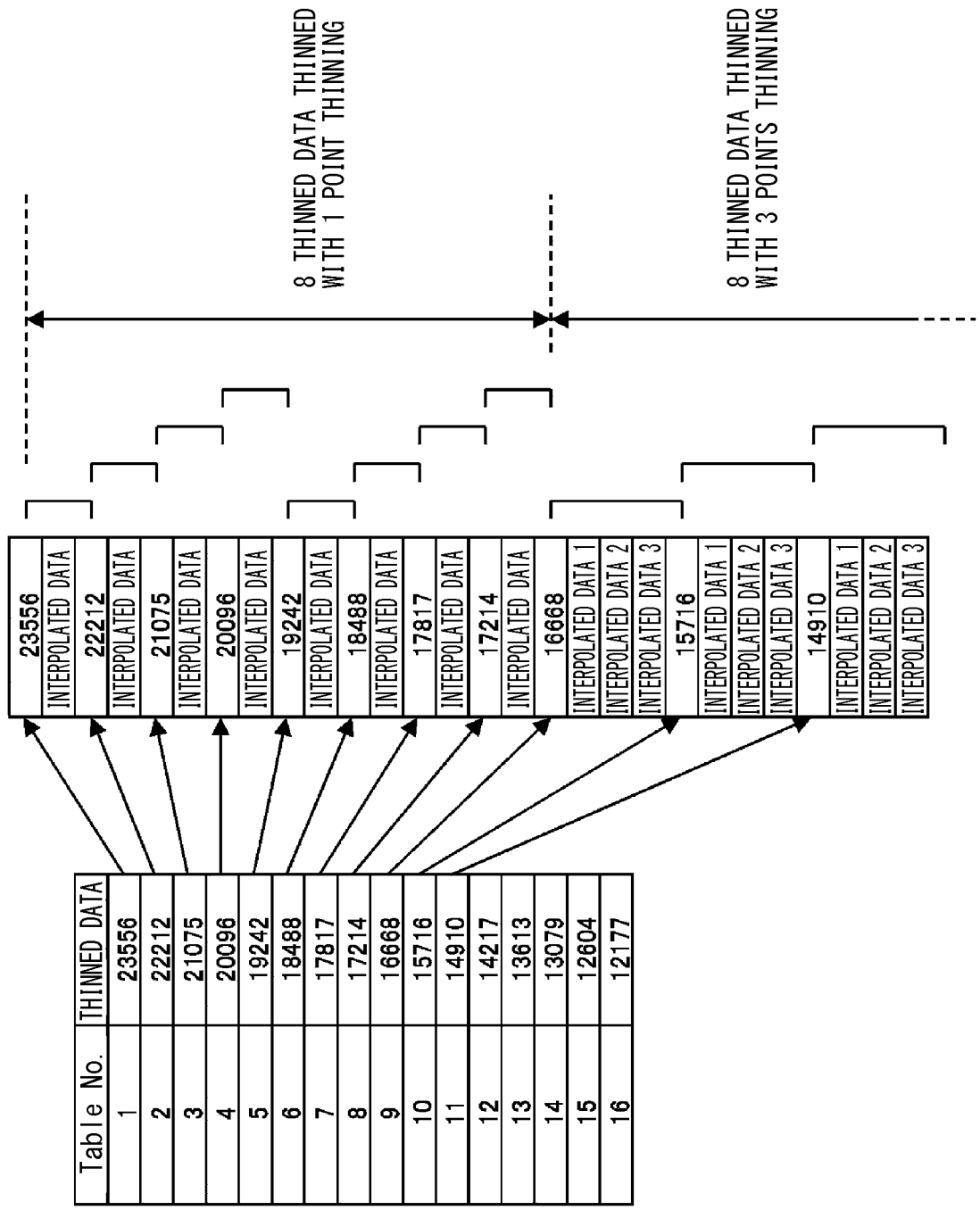
FIG. 5 is a chart to show data stored in a table and relating to the slow-up control and to explain interpolation of thinned data.

FIG. 5 is a chart to show thinned data and interpolated data which are stored in the table 111 and used for the slow-up control. According to the slow-up control, to reliably rotate and drive the stepping motor regularly, a change amount of a pulse width of a driving pulse is set high in a first area having a low pulse frequency of a driving pulse, and a change amount of a pulse width of a driving pulse is set low in a second area having a higher pulse frequency of a driving pulse than the first area.

In this regard, in the present embodiment, thinned data stored in the table 111 is thinned at a thinning number lower than a standard value in the first area having a low pulse frequency of the driving pulse, and is thinned at a thinning number higher than the standard value in the second area having a higher pulse frequency of the driving pulse than the first area. That is, the number of interpolated data which is calculated by the above-mentioned linear interpolation is less than the standard value in the first area having a low pulse frequency of a driving pulse, and more than the standard value in the second area having a higher pulse frequency of a driving pulse than the first area. Thus, by varying a thinning number of thinned data in accordance with an area having a frequency of a driving pulse, it is possible to further reduce the number of thinned data which need to be stored in the table 111 while keeping proximity of thinned data generated by linear interpolation with respect to each normal data designated by table data designating a pulse width of an original driving pulse.

As shown in FIG. 5, as thinned data which is used for a slow-up control, the thinned data whose thinning number of data are gradually increased as pulse frequencies are increased with a lapse of time is stored. In the embodiment, for example, in the table 111, (1) 8 thinned data thinned with 1 point thinning is stored as initial data for a slow-up control, (2) next, a thinning number is increased by 2 (=$2^1$), and eight thinned data thinned with 3 (=1+2) point thinning are stored, (3) next, a thinning number is increased by 4 (=$2^2$), and eight thinned data thinned with 7 (=3+4) point thinning are stored, (4) next, a thinning number is increased by 8 (=$2^3$), and eight thinned data thinned with 15 (=7+8) point thinning are stored, and (5) subsequently, a thinning number is increased by 16 (=$2^4$), and eight thinned data thinned with 31 (=15+16) point thinning are stored.

The interpolation number indicating part 113 indicates an interpolation number to the driving pulse control part 112. In addition, the interpolation number indicating part 113 indicates the same interpolation number as the thinning number of thinned data stored in the table 111. For example, when data is thinned with 1 point thinning, the interpolation number is 1, when the data is thinned with 3 point thinning, the interpolation number is 3, when the data is thinned with 7 point thinning, the interpolation number is 7, and so on. Hence, the interpolation number indicating part 113 indicates the interpolation number less frequently than the standard value in the first area having a low pulse frequency of a driving pulse, and indicates the interpolation number more frequently than the standard value in the second area having a higher pulse frequency of a driving pulse than the first area.

In case of the example in FIG. 5, (1) the interpolation number indicating part 113 indicates 1 as the interpolation number for first eight thinned data (eight thinned data thinned with 1 point thinning) in the table 111, (2) increases the interpolation number by 2 (=$2^4$) for subsequent eight data, and indicates 3 (=1+2) as the interpolation number, (3) increases the interpolation number by 4 (=$2^2$) for subsequent eight data, and indicates 7 (=3+4) as the interpolation number, (4) increases the interpolation number by 8 (=$2^3$) for subsequent eight thinned data, and indicates 15 (=7+8) as the interpolation number, and (5) increases the interpolation number by 16 (=$2^4$) for subsequent thinned data, and indicates 31 (=15+16) as the interpolation number.

The driving pulse control part 112 reads thinned data (thinned data used to determine a pulse width at a timing at which the thinned data is read) from the table 111 and reads next thinned data (thinned data to which a next table number is allocated) stored in the table 111 to be used as a pulse width at a next timing, every time a predetermined period of time passes. The driving pulse control part 112 generates interpolated data by linear interpolation based on the thinned data and the next thinned data in accordance with an interpolation number given from the interpolation number indicating part 113. Further, the driving pulse control part 112 sequentially outputs driving pulses of pulse widths designated by the thinned data read from the table 111 and the above-mentioned interpolated data.

More specifically, during the slow-up control, the driving pulse control part 112 reads the thinned data from the table 111 every time a counter 93 (see FIG. 2) counts a predetermined fixed period of time. The driving pulse control part 112 uses a numerical value designated by the read thinned data as a pulse width of a driving pulse, and outputs the driving pulse to the driving part 114. The driving pulse control part 112 reads thinned data from the table 111 at regular intervals from a beginning to an end of the slow-up control.

When reading thinned data at the above-mentioned timing, the driving pulse control part 112 reads the above-mentioned next thinned data, too, from the table 111, and calculates interpolated data by linear interpolation based on the thinned data and the next thinned data in accordance with the interpolation number given by the interpolation number indicating part 113. Every time the counter 93 counts a predetermined fixed period of time from the above-mentioned timing at which the thinned data is read, the driving pulse control part 112 sequentially reads a numerical value of the calculated interpolated data to use as a pulse width of a driving pulse. This predetermined fixed period of time is a time indicating an interval at which interpolated data calculated in accordance with the given interpolation number is distributed.

The driving part 114 drives the stepping motor 70 in accordance with a driving pulse of a pulse width outputted by the driving pulse controlling part 112.

The driving pulse control part 112 interpolates thinned data as follows, for example, and outputs a driving pulse. In addition, in the following description, Data[i] represents thinned data of a table number i in the table 111. Data[k] represents the thinned data read from the table 111 every time the above-mentioned predetermined period of time passes (thinned data which is used to determine a pulse width at a timing at which the thinned data is read and which is referred to as "first thinned data"). Data[k+1] represents the next thinned data stored in the table 111 to be used as a pulse width at the above-mentioned next timing (thinned data to which a next table number is allocated and is referred to as second thinned data).

Interpolation of thinned data thinned with 1 point thinning $$A = (Data[k] - Data[k+1])/2 \quad (1)$$

$$\text{Interpolated data} = Data[k] - A \quad (2)$$

The driving pulse control part 112 reads Data[k] and Data[k+1] from the table 111, and outputs a driving pulse of a pulse width having a numerical value represented by Data[k]. Next, the driving pulse control part 112 calculates the difference value A by dividing a difference between thinned data of table numbers k and k+1 by 2 (=given interpolation number+1) (equation 1), and calculates a value obtained by subtracting the difference value A from Data[k] as interpolated data (equation 2). When the predetermined fixed period of time is counted per interpolation number since Data[k] is read, the driving pulse control part 112 reads a numerical value of interpolated data to make a pulse width of a driving pulse.

Interpolation of thinned data thinned with 3 point thinning $$A = (Data[k] - Data[k+1])/4 \quad (3)$$

$$\text{Interpolated data } 1 = Data[k] - A \quad (4)$$

$$\text{Interpolated data } 2 = \text{Interpolated data } 1 - A \quad (5)$$

$$\text{Interpolated data } 3 = \text{Interpolated data } 2 - A \quad (6)$$

The driving pulse control part 112 reads Data[k] and Data[k+1] from the table 111, and outputs a driving pulse of a pulse width having a numerical value represented by Data[k]. Next, the driving pulse control part 112 calculates the difference value A by dividing a difference between thinned data of table numbers k and k+1 by 4 (=given interpolation number+1) (equation 3), and calculates a value obtained by subtracting the difference value A from Data[k] as interpolated data 1 (equation 4). When the predetermined fixed period of time is counted per interpolation number since Data[k] is read, the driving pulse control part 112 reads a numerical value of each interpolated data sequentially to make a pulse width of a driving pulse (the same as interpolation of each thinned data as described below).

Next, the driving pulse control part 112 calculates a value obtained by subtracting the difference value A from interpolated data 1 as interpolated data 2 (equation 5), and outputs a next driving pulse of a pulse width having a numerical value represented by interpolated data 2. Next, the driving pulse control part 112 calculates a value obtained by subtracting the difference value A from interpolated data 2 as interpolated data 3 (equation 6), and outputs a next driving pulse of a pulse width having a numerical value represented by interpolated data 3.

Interpolation of thinned data thinned with 7 point thinning $$A = (Data[k] - Data[k+1])/8 \quad (7)$$

$$\text{Interpolated data } 1 = Data[k] - A \quad (8)$$

$$\text{Interpolated data } 2 = \text{Interpolated data } 1 - A \quad (9)$$

$$\text{Interpolated data } 3 = \text{Interpolated data } 2 - A \quad (10)$$

$$\text{Interpolated data } 4 = \text{Interpolated data } 3 - A \quad (11)$$

$$\text{Interpolated data } 5 = \text{Interpolated data } 4 - A \quad (12)$$

$$\text{Interpolated data } 6 = \text{Interpolated data } 5 - A \quad (13)$$

$$\text{Interpolated data } 7 = \text{Interpolated data } 6 - A \quad (14)$$

The driving pulse control part 112 reads Data[k] and Data[k+1] from the table 111, and outputs a driving pulse of a pulse width having a numerical value represented by Data[k]. Next, the driving pulse control part 112 calculates the difference value A by dividing a difference between thinned data of table numbers k and k+1 by 8 (=given interpolation number+1) (equation 7), and calculates a value obtained by subtracting the difference value A from Data[k] as interpolated data 1 (equation 8).

Next, the driving pulse control part 112 calculates a value obtained by subtracting the difference value A from interpolated data 1 as interpolated data 2 (equation 9), and outputs a next driving pulse of a pulse width having a numerical value represented by interpolated data 2. Next, the driving pulse control part 112 calculates a value obtained by subtracting the difference value A from interpolated data 2 as interpolated data 3 (equation 10), and outputs a next driving pulse of a pulse width having a numerical value represented by interpolated data 3. Next, the driving pulse control part 112 calculates a value obtained by subtracting the difference value A from interpolated data 3 as interpolated data 4 (equation 11), and outputs a next driving pulse of a pulse width having a numerical value represented by interpolated data 4. Next, the driving pulse control part 112 calculates a value obtained by subtracting the difference value A from interpolated data 4 as interpolated data 5 (equation 12), and outputs a next driving pulse of a pulse width having a numerical value represented by interpolated data 5. Next, the driving pulse control part 112 calculates a value obtained by subtracting the difference value A from interpolated data 5 as interpolated data 6 (equation 13), and outputs a next driving pulse of a pulse width having a numerical value represented by interpolated data 6. Next, the driving pulse control part 112 calculates a value obtained by subtracting the difference value A from interpolated data 6 as interpolated data 7 (equation 14), and outputs a next driving pulse of a pulse width having a numerical value represented by interpolated data 7.

In addition, although not described, when thinned data is thinned with 15 points thinning and thinned data is thinned with 31 points thinning, interpolated data is calculated in a similar way to the above description, and a driving pulse is outputted in accordance with the interpolated data.

In the present embodiment, thinned data which is thinned at a thinning number which varies at a power of 2 is stored in the table 111, and, since the interpolation number indicating part 113 varies the interpolation number at the power of 2 in accordance with the thinning number of the thinned data, a divisor is represented by the power of 2 when the difference value A of thinned data stored in the table 111 is calculated (equation 1, equation 3 and equation 7). Consequently, calculation of the difference value can be realized by a bit shift and a complex divider becomes unnecessary, so that it is possible to reduce a circuit scale.

In addition, the driving pulse control part 112 may keep a value after a decimal point without rounding the difference value A to an integer value when calculating the difference value A in equation 1, equation 3 and equation 7, and round each interpolated data to an integer value when calculating each interpolated data in equation 2, equation 4 to equation 6 and equation 8 to equation 14. By doing so, it is possible to prevent cancellation of significant digits of each interpolated data.

Further, the slow-up control has been described in the above description. However, in case of the slow-down control, thinned data of a last table number stored in the table 111 is used as a default value contrary to the above description and interpolated data is calculated by similar way to the slow-up control and pulse width of a driving pulse is set as the time passes.

As described above, according to the present embodiment, a smaller memory capacity and a smaller circuit configuration make it possible to perform a slow-up control or a slow-down control of the stepping motor 70.

In addition, the present disclosure is not limited to the configuration of the embodiment, and can be variously deformed. For example, one embodiment of an image forming apparatus according to the present disclosure has been described using a multifunction peripheral in the above embodiment. However, the above embodiment is an exemplary embodiment, and other electronic devices, such as other image forming apparatuses including printers, copy machines and facsimile devices, may be used.

Further, a configuration and processing described in the above embodiment with reference to FIGS. 1 to 5 are an exemplary configuration and processing according to one embodiment of the present disclosure, and do not intend to limit the present disclosure to these configuration and processing.

What is claimed is:

1. A stepping motor driving device comprising:
    a table configured to store thinned data which is thinned from original data and designates a pulse width of a driving pulse relating to a slow-up control or a slow-down control of a stepping motor;
    a driving pulse control part configured to sequentially read the thinned data from the table at predetermined intervals, to interpolate the thinned data in accordance with a given interpolation number so as to generate interpolated data and to output the driving pulse with the pulse width designated by the thinned data or the interpolated data by sequentially using the thinned data and the interpolated date at predetermined intervals;
    an interpolation number indicating part configured to indicate the interpolation number to the driving pulse control part; and
    a driving part configured to drive the stepping motor in accordance with the driving pulse outputted by the driving pulse control part.

2. The stepping motor driving device according to claim 1,
    wherein the driving pulse control part is configured to generate the interpolated data by linear interpolation.

3. The stepping motor driving device according to claim 2,
    wherein the table is configured to store the thinned data which is thinned less frequently than a standard value in a first area and is thinned more frequently than the standard value in a second area having a higher pulse frequency of the driving pulse than the first area,
    the interpolation number indicating part is configured to indicate the interpolation number less frequently than the standard value in the first area and to indicate the interpolation number more frequently than the standard value in the second area.

4. The stepping motor driving device according to claim 3,
    wherein the table is configured to store the thinned data which is thinned at a thinning number varied at a power of 2,
    the interpolation number indicating part is configured to vary the interpolation number at the power of 2 in accordance with the thinning number of the thinned data.

5. The stepping motor driving device according to claim 1,
    wherein the driving pulse control part is configured to read, from the table, first thinned data having a predetermined table number and second thinned data having another table number next to the predetermined table number of the first thinned data, to calculate a difference value by dividing a difference between the first thinned data and the second thinned data by a number obtained by adding 1 to the interpolation number and to calculate the interpolated data by subtracting the difference value from the first thinned data.

6. The stepping motor driving device according to claim 5,
    wherein the driving pulse control part is configured to keep a value after a decimal point without rounding the difference value when calculating the difference value and to round the interpolated data when calculating the interpolated data.

7. The stepping motor driving device according to claim 1, wherein the driving pulse control part is configured to read the thinned data from the table at regular intervals from a beginning to an end of the slow-up control.

8. An image forming apparatus comprising:
    the stepping motor driving device according to claim 1;
    a stepping motor configured to be driven by the stepping motor driving device;
    a rotating member configured to be driven by the stepping motor; and
    an image forming part configured to form an image on a recording medium.

* * * * *